June 14, 1949.　　　　M. E. WOOD　　　　2,473,402
ELECTRICAL BAKING MOLD
Filed June 8, 1948　　　　2 Sheets-Sheet 1
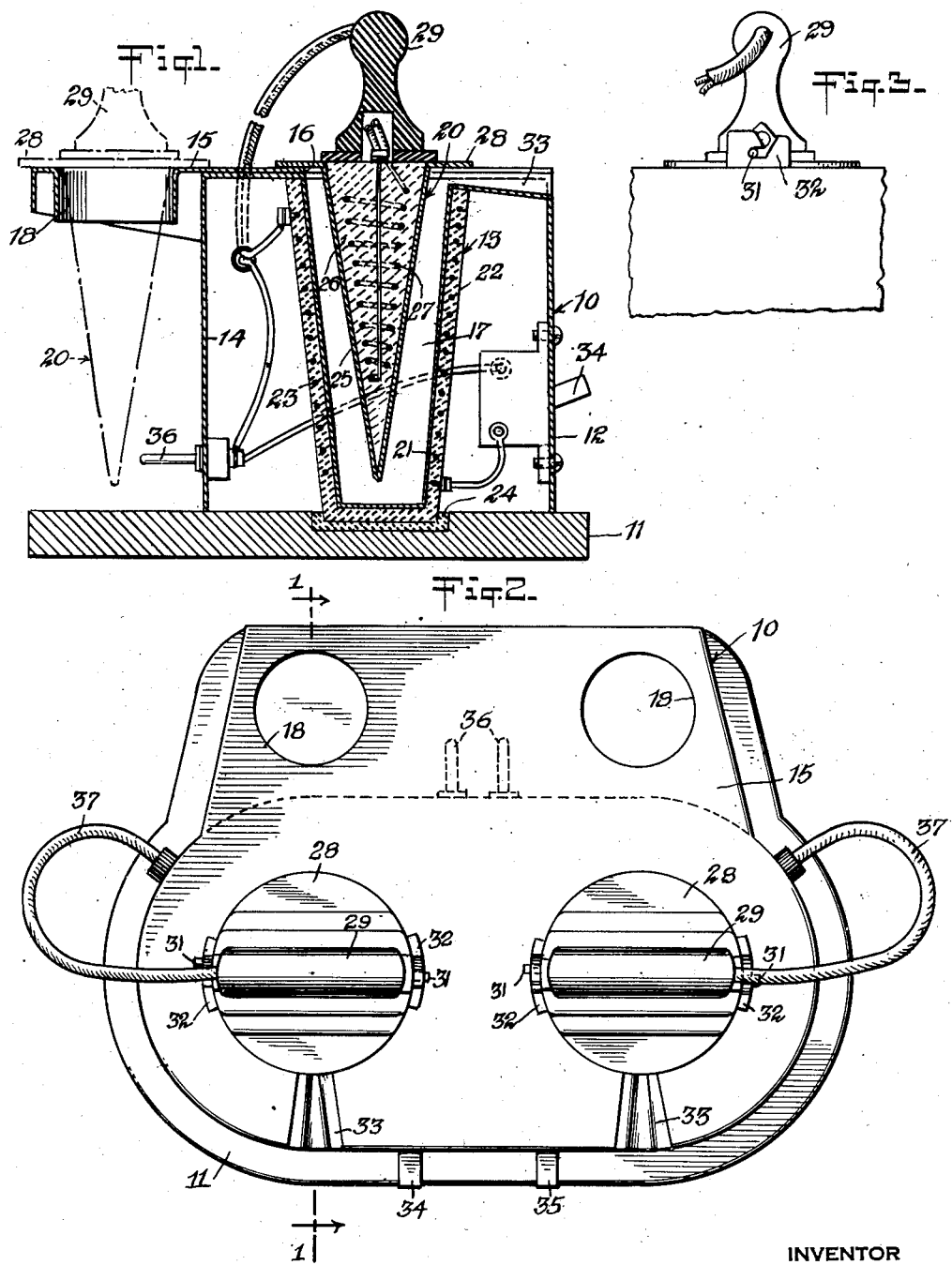
INVENTOR
Milton E. Wood
BY
Munn, Liddy & Glaccum
ATTORNEYS June 14, 1949.    M. E. WOOD    2,473,402
ELECTRICAL BAKING MOLD
Filed June 8, 1948    2 Sheets-Sheet 2
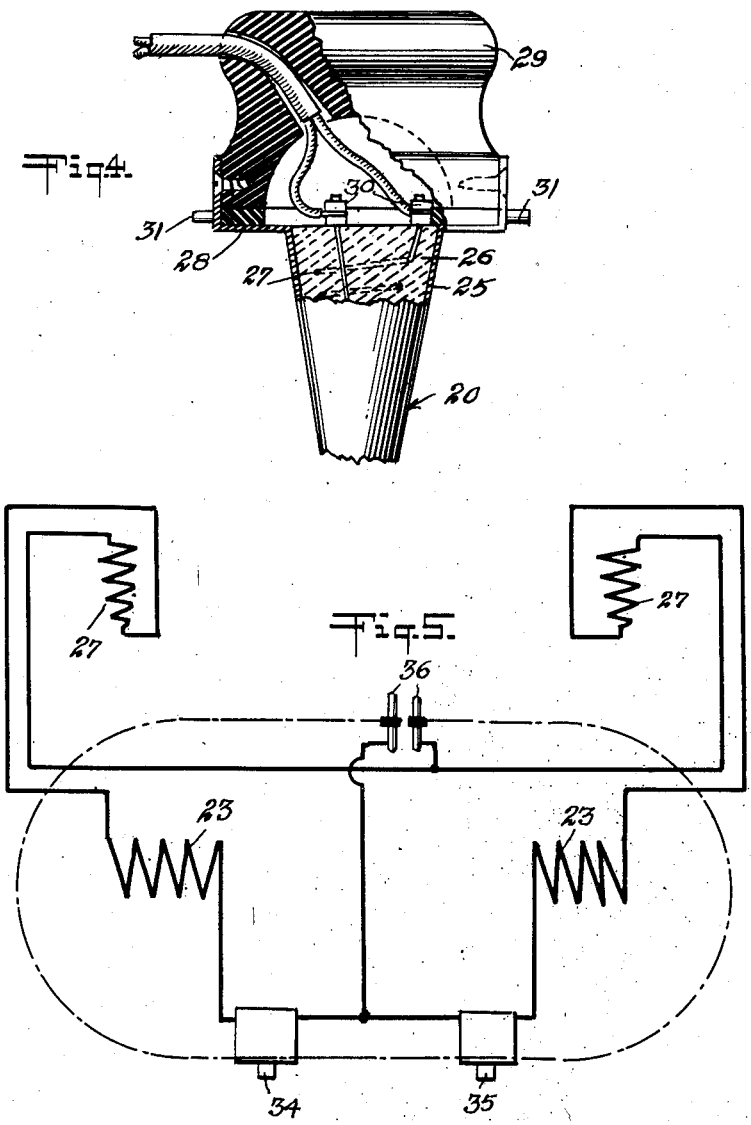
INVENTOR
Milton E. Wood
BY
Munn, Liddy & Glaccum
ATTORNEYS Patented June 14, 1949

2,473,402

UNITED STATES PATENT OFFICE 2,473,402

ELECTRICAL BAKING MOLD

Milton E. Wood, Staten Island, N. Y.

Application June 8, 1948, Serial No. 31,656

1 Claim. (Cl. 219—19)

My invention relates to an electrical baking mold with ceramic inter-changeable elements and more particularly to a device that may be utilized in the household as well as commercially to produce a food cup to be served hot.

The principal objective of my invention was to invent a device for the molding and baking of containers from suitable food batters which would serve as edible receptacles for hot sauces, chicken a la king, etc.

A further objective was to provide such a device that would be simple and compact in its structure and would facilitate the baking of the food cup in an economical and expeditious manner.

Further objectives and advantages of my invention will be apparent as I proceed with the description.

With reference to the drawings—

Fig. 1 is a sectional view on line 1—1 of Fig. 2;

Fig. 2 is a plan view of my electrical baking mold;

Fig. 3 is a detailed side elevation illustrating the locking means on the male heating element;

Fig. 4 is an enlarged side elevation partially in section of the male element illustrating the electrical connections; and Fig. 5 is a schematic wiring diagram of my device.

As shown in the drawings, my mold 10 consists of a suitable base such as Bakelite 11 on which is mounted a metal housing 12 enclosing two cone-forming cups 13. Secured to the top of the housing 12 and extending beyond the rear wall 14 of the housing is an upper plate 15. The upper plate 15 is provided with two openings 16 that register with the cavities 17 of the cup elements 13 and two additional circular openings 18 on the rear portion of the plate 15 that furnish support means for the male heating element 20 when not in use. The inner wall 21 of the cup element 13 is of metal while the outer side of this metal lining is surrounded by a ceramic material 22 into which is embedded a heating element 23. The ceramic material 22 containing the heating element 23 may be removed for replacement by removing the base and slipping out the entire element. Due to the heat generated by the heating element 23, a portion of the base 11 is hollowed out below each of the cup elements 13, and is filled with insulating material 24 on which the cup elements 13 rest.

As shown in Fig. 4, the male heating element 20 is adapted to position in the cup cavity 17 in such a manner that it will be centered and in spaced relation to the wall 21 of the cavity. As shown by the drawings, the male heating element 20 is conical in shape so that when it is inserted into the cavity 17 there is sufficient distance between the outer wall 25 of the male heating element and the wall 21 of the cup element 13 so that the batter or dough will have room to rise. The center core 26 of the male element 20 is made of ceramic material into which a heating element 27 has been embedded, and the outer portion of the male element is enclosed by the wall 25. Secured to the upper portion of the male heating element 20 is a flat circular cover 28 which is greater in diameter than the opening 16 in the upper plate 15 and, therefore, when the male element 20 is placed in the cavity 17 it is supported in this manner.

Also secured to the upper cover 28 is a handle 29 having housed within it the electrical terminals 30 from the heating element 27. The electrical conductors 31 connect the heating elements in the respective cups and male elements in series relation with each other. As shown in Fig. 3 diagrammatically opposite sides of the handle 29 are provided with projections 31 which engage in bayonet joints 32 on opposite sides of the opening 16. The bayonet joints 32 are secured to the upper plate 15 and when the male element 20 is placed within the cavity 17, a slight twist of the handle 29 in a clockwise direction locks the projections 31 in the joints 32 thereby securely holding the male element in position during the baking operation. Each cup 13 is also provided with overflows 33 that connect the interior of the cavity with the upper portion of the housing.

Also secured to the walls of the housing 10 are a pair of switches 34 and 35 which enables individual baking operation of the cups. On the rear wall 14 of the housing 12 there is a male plug 36 which may be connected to any suitable source of electricity for the operation of the mold.

Fig. 5 is a schematic wiring diagram of the mold showing the two cup heating elements 23, the two male heating elements 27 being connected in series relation with each other. These individual pairs of elements may be selectively operated through the switches 34 and 36 and a suitable source of electricity may be connected to the male plug 36 positioned at the rear of the housing.

To operate the device heat is applied by operation of the switches 34 and 35. When the proper temperature is obtained a specific amount of batter is poured into the cavity 17 and the male unit 20 is then placed in the cavity and locked in position. Due to the spacing between the male unit 20 and the cavity wall 21 the batter will be allowed to rise and aerate resulting in formation of a delicious food container or cone. To remove the product, the male element 20 may be unclamped by a slight twisting movement in a counter-clockwise direction and placed in the opening 18 where it will be supported until another baking operation.

While the invention has been described in detail with respect to a present preferred form which it may assume, it is not to be limited to such details and form since many changes and modifications may be made in the invention without departing from the spirit and scope of the invention in its broadest aspects. Hence, it is desired to cover any and all forms and modifications of the invention which may come within the language or scope of the appended claim:

I claim:

A baking mold including a plurality of cup shaped elements defining batter receiving cavities, a base on said mold, a heating element surrounding the outer wall of said cavities and supported by said base whereby by removing the base said heating element may be replaced, male elements adapted to be suspended in said cavities in spaced relation to the cavity walls, said male elements being conically shaped and having heating elements, means for locking said male elements in said cavities and electrical means connecting said heating elements in series relation whereby when food batter is placed in said cavities an edible food cup will be formed.

MILTON E. WOOD.

REFERENCES CITED

The following references are of record in the file of this patent:

UNITED STATES PATENTS

| Number | Name | Date |
|---|---|---|
| 1,293,819 | Lewison | Feb. 11, 1919 |
| 1,314,602 | Miglietta | Sept. 2, 1919 |
| 2,078,189 | Bemis | Apr. 20, 1937 |